April 22, 1924.
H. L. TANNER
SPEED INDICATOR
Filed Aug. 27, 1918
1,491,322
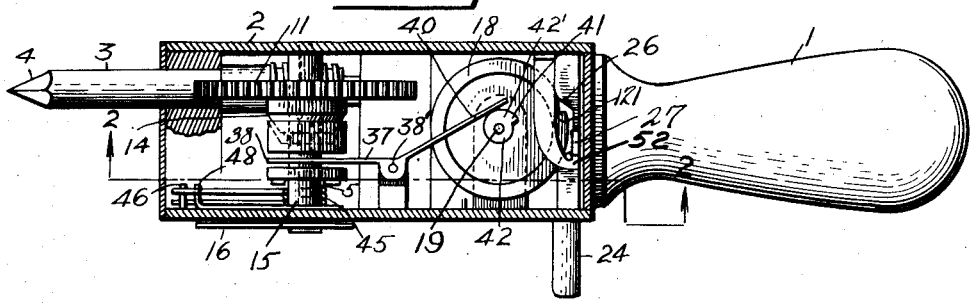
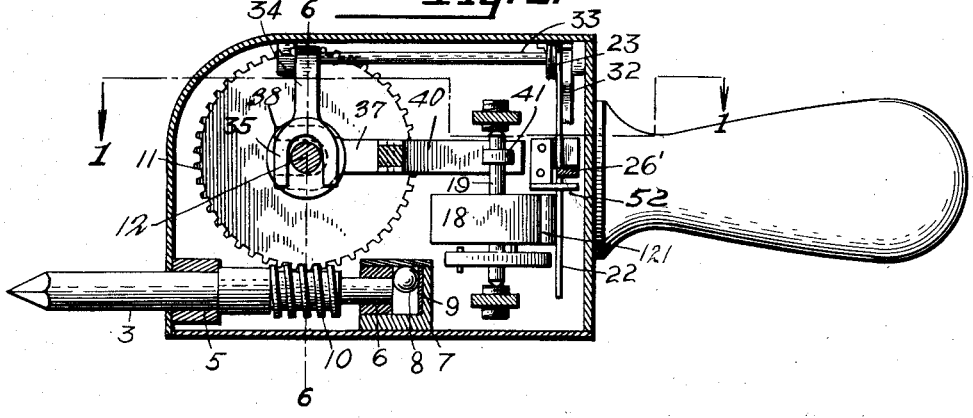
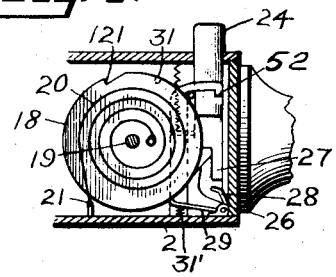
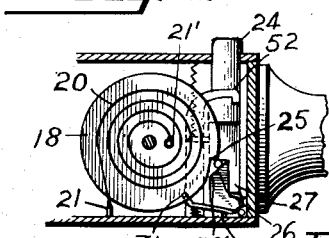
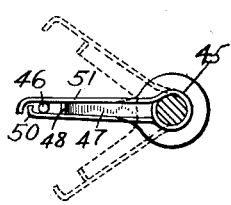
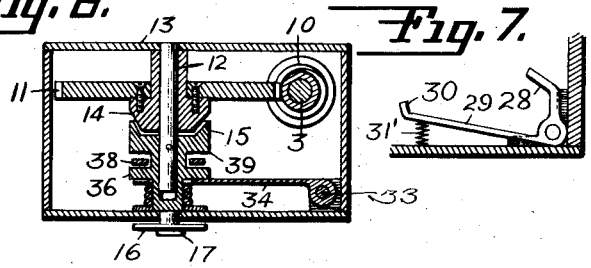
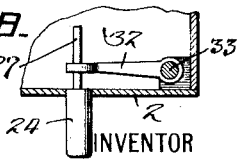
INVENTOR
HARRY L. TANNER.
BY Herbert H. Thompson
his ATTORNEYS Patented Apr. 22, 1924.

1,491,322

UNITED STATES PATENT OFFICE.

HARRY L. TANNER, OF BROOKLYN, NEW YORK, ASSIGNOR TO TANNER ENGINEERING COMPANY, INC., OF BROOKLYN, NEW YORK, A CORPORATION OF NEW YORK.

SPEED INDICATOR.

Application filed August 27, 1918. Serial No. 251,619.

*To all whom it may concern:*

Be it known that I, HARRY L. TANNER, a citizen of the United States of America, residing at Brooklyn, in the county of Kings and State of New York, have invented certain new and useful Improvements in Speed Indicators, of which the following is a specification.

This invention relates to an instrument for measuring the speed of rotating shafts. The objects of the invention are to simplify the construction of such instruments so that a compact indicator may be produced which is at once small enough to carry in the hand and yet both of low cost of manufacture and great accuracy. Referring to the drawings in which one of the preferred constructions of the invention is illustrated, Fig. 1 is a longitudinal section partly in elevation of an indicator, the section being taken approximately one line 1—1 of Fig. 2. Fig. 2 is a sectional inverted plan view the section being taken approximately on line 2—2 of Fig. 1. Fig. 3 is a detail showing the thumb piece and balance wheel in a position about to release the balance wheel for an oscillation. Fig. 4 is a similar view showing the balance wheel released and in the act of oscillating with the thumb-piece still held partially down. Fig. 5 is a detail of the spring means used to centralize the pointer, the view being a section on line 5—5 of Fig. 1. Fig. 6 is a vertical section on line 6—6 of Fig. 2. Fig. 7 is a detail of the latch or stop used to arrest the balance wheel. Fig. 8 is a detail view of one of the actuating levers shown as broken away in Fig. 2.

The instrument is shown as made in the form of a small device which may be conveniently carried in the hand and when used is adapted to be held by the handle 1. The mechanism may be enclosed in a suitable casing 2 attached to the handle and from which projects the shaft 3 or other member adapted to be driven at the speed of the shaft the velocity of rotation of which it is desired to measure. For this purpose the end 4 of shaft 3 may be pointed as shown. Shaft 3 is journaled in bearings 5 and 6 within the casing 2. A suitable thrust-bearing 7 may be provided for the rear end of the shaft. Said bearing is shown as equipped with a ball 8 eccentrically placed with respect to the end of the shaft as shown so that the ball will roll between the end of the shaft and the plate 9 of the bearing.

Suitable reduction gearing transmits the rotation of shaft 3 to other mechanism within the casing. The said gearing is shown in the form of a worm 10 mounted on the shaft 3 which meshes with a worm wheel 11 loosely mounted on a shaft 12 pinned or otherwise secured to the top 13 of casing 2. Said worm wheel may be provided with a clutch face 14. Also loosely mounted on shaft 12 is a co-operating clutch member 15. An indicating pointer 16 of any suitable form may be secured to the outer portion 17 of said clutch member.

The operation of the clutch member is under the control both of a manual means and of a time measuring device. The latter device is shown in the form of a small flywheel or balance wheel 18 mounted upon a shaft 19. Pinned to said wheel is a hairspring or other highly tempered spring 20 which may serve to oscillate the balance wheel if set in motion or released at a definite period in the manner well known in watches and small clocks. The said spring is shown as secured at its free end 21 to the case 2 and at its inner end 21' to the wheel. Any suitable means may be used to cause the wheel to be set in motion. For this purpose the balance wheel is provided with a notch 121 which a spring 23 engages at predetermined times. The spring 23 is shown in the form of a coiled spring having a free end 22. A finger piece 24 is mounted adjacent the balance wheel and is provided with a notch 25 which engages the free end 22 of the spring. As the finger piece is depressed from the position shown in Fig. 1 to the position shown in Fig. 3, the spring 22 will be carried downwardly as seen in Fig. 3 until the said spring engages an inclined surface 26 on lug 26' whereby the spring will be carried into the notch 121 and at the same time released from the notch 25. An additional arm 52 may be provided to hold the spring 23 in its uppermost position so that it may be engaged by the notch 25 as the finger piece is depressed.

The finger piece is also shown as provided with a foot 27 which engages an upstanding arm 28 of the catch 29. The free end 30 of said catch is normally pressed into a hole or notch 31 in the surface of said balance wheel by means of a spring 31' so as to hold the same stationary and arrest movement of the balance wheel. As the thumb piece is depressed, however, the catch 29 is released and at the same time the spring 23 placed in the notch 121 and released from notch 25 so that the balance wheel is given a sudden impulse in a counter clockwise direction—(Fig. 3).

The balance wheel will then under the influence of the hair spring make a complete oscillation returning the notch 31 to the catch 29, where the wheel will again be arrested, the spring 31' under said catch acting to throw it into the notch. Obviously, either a complete to and fro oscillation or any predetermined portion of such oscillation may be employed if desired.

Also connected to the finger piece is an arm 32 mounted upon a shaft 33. Secured to said shaft adjacent its other end is a spring arm or leaf spring 34 provided with a forked end 35 engaging a collar 36 on clutch member 15. As the finger piece is depressed, the shaft 33 is partially rotated to place the spring 34 under stress and to thereby tend to close clutch 15. Also engaging said clutch, however, is a relatively rigid arm 37 having a forked end 38 engaging said clutch member at any suitable point such as between the collar 36 and the shoulder 39. The said arm or lever 37 is pivoted at 38' to the case and is provided with an oppositely extended portion 40 engaging a cam 41 on the shaft 19 of balance wheel 18. It will readily be seen that as long as the end 40 is resting on a high portion 42' of the cam, the closing of the clutch 15 will be prevented but that if the low portion 42 of the cam is under said member and at the same time the leaf spring 34 is placed under tension by the depression of finger piece 24, the clutch will be closed but will be opened again as soon as the high portion of the cam revolves under the arm 40.

In order that the indicator or pointer 16 may be brought back to the initial position after each reading, I have shown a spring 45 coiled about the member 15 and having its free ends 50 and 51 extending outwardly to engage a pin 46 on the casing. An arm 47 secured to said member 15 is provided with an upstanding portion 48 which engages between said free ends 50 and 51 as shown in Fig. 5 so that one end of the spring will be placed under tension no matter which way the member 15 is revolved.

The operation of my invention is as follows: The operator after grasping the handle 1 and placing the shaft 3 against the rotating shaft the speed of which is to be measured, depresses the finger piece 24 when he is ready to take a reading. The depression of said finger piece catches the spring 23 carries it with it placing it under tension and finally releases the spring by the action of the cam or inclined surface 26. At the same time the foot 27 of the finger piece releases the stop 29 so that an impulse is imparted to the balance wheel. The operator then allows the thumb piece 24 to rise slightly as shown in Fig. 4 so that the member 29 may be released. The balance wheel will then swing through an oscillation of definite period and will be arrested by the stop 29 as it returns to its initial position. In the meantime the spring 23 will have been caught by the arm 52 and held in a position to be re-engaged by the finger piece. The cam 41 is so designed and positioned upon the shaft 19 that the clutch is allowed to become engaged during only a predetermined portion of an oscillation of the balance wheel, the portion being so chosen as to give uniformly accurate results and at the same time a maximum period. As the finger piece is held down spring 34 is under continuous tension so that the clutch will be thrown into engagement the instant the low portion 42 of the cam 41 turns under the arm 40. If the finger piece is released, however, the clutch will immediately be thrown out of engagement irrespective of the movements of the cam and the pointer returned to zero by the action of spring 45. As long as the finger piece is held down, however, the pointer will remain in the indicating position, since the friction of the forked end 35 of leaf spring 34 on collar 36 will overcome the action of centralizing spring 45.

The operator may, of course, by holding finger piece 24 entirely down, permit more than one oscillation of the balance wheel, and thus measure the number of revolutions of a shaft through successive periods. If the finger piece 24 is held down for two complete oscillations for instance, the reading of the pointer 16 is divided by 2 to obtain the average speed of the shaft during said two oscillations.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a speed indicator, a member adapted to be driven at the speed to be measured, an indicating member, a clutch for connecting said members, an oscillatory member having a predetermined period, means for causing an oscillation thereof and means brought into action by the oscillation of said member for closing said clutch as the member starts on an oscillation and opening the same as it nears completion of said oscillation.

2. In a speed indicator, a member adapted to be driven at the speed to be measured, an indicating member, means for intermittently coupling said members together, an oscillatory member having a predetermined period, means for causing an oscillation thereof and means brought into action by the oscillation of said member for closing and opening said coupling means at predetermined points in an oscillation.

3. In a speed indicator, a balance wheel, a spring therefor, means for releasing said wheel at will, arresting means therefor, a continuously driven member, an indicating member, and means actuated by an oscillation of said wheel for limiting the driving of said last member from said first member to a predetermined portion of an oscillation.

4. In a speed indicator, a member adapted to be driven at the speed to be measured, an indicating member, a clutch for connecting said members, hand operated means for exerting yielding pressure to close the clutch, a time measuring device, and means on said device for preventing closure of the clutch except during a predetermined period.

5. In a speed measuring instrument, a balance wheel, a finger piece, a spring actuated by said finger piece to engage and impart an impulse to said wheel, and spring means for returning said wheel.

6. In a speed measuring instrument, a balance wheel, a finger piece, a spring actuated by said finger piece to engage and impart an impulse to said wheel, spring means for returning said wheel, and a stop for arresting and holding said wheel on a return oscillation.

7. In a speed indicator, a member adapted to be driven at the speed to be measured, an indicating member, a clutch for connecting said members, hand operated means for exerting yielding pressure to close the clutch, a time measuring device, means on said device for preventing closure of the clutch except during a predetermined period, resilient means for returning said indicating member to its initial position, the pressure of said hand means serving to prevent the action of said resilient means.

8. In a speed measuring instrument, a balance wheel, a finger piece, a spring actuated by said finger piece to engage and impart an impulse to said wheel, spring means for returning said wheel, and a stop for arresting said wheel on a return oscillation, said finger piece also serving to release said stop.

9. In a speed measuring instrument, a balance wheel, a finger piece, resilient means brought into action by depression thereof for causing an oscillation of said wheel, an indicator rendered operative by and during an oscillatory movement of said wheel, and means brought into action by the release of said finger piece for resetting said indicator.

10. In a speed indicator, a member adapted to be driven at the speed to be measured, an indicating member, a clutch for connecting said members, hand operated means for exerting yielding pressure to close the clutch, a balance wheel, said hand means also serving to release said wheel for an oscillation, and means brought into action by such wheel for permitting said other means to close the clutch.

11. In a speed indicator, a member adapted to be driven at the speed to be measured, an indicating member, a clutch for connecting said members, hand operated means for exerting yielding pressure to close the clutch, a balance wheel, said hand means also serving to release said wheel for an oscillation, and means brought into action by such wheel for permitting said other means to close the clutch for a predetermined portion of an oscillation.

In testimony whereof I have affixed my signature.

HARRY. L. TANNER.